United States Patent
Tsukada et al.

(10) Patent No.: US 7,794,558 B2
(45) Date of Patent: Sep. 14, 2010

(54) METHOD OF BONDING FLUORORESIN FILMS, AND FLUORORESIN FILM

(75) Inventors: Tetsuro Tsukada, Ibaraki (JP); Tomomi Takahashi, Wakayama (JP)

(73) Assignee: Asahi Glass Company, Limited, Tokyo (JP)

( * ) Notice: Subject to any disclaimer, the term of this patent is extended or adjusted under 35 U.S.C. 154(b) by 391 days.

(21) Appl. No.: 11/945,312

(22) Filed: Nov. 27, 2007

(65) Prior Publication Data

US 2008/0073021 A1    Mar. 27, 2008

Related U.S. Application Data

(60) Division of application No. 10/943,944, filed on Sep. 20, 2004, now abandoned, which is a continuation of application No. PCT/JP03/03421, filed on Mar. 20, 2003.

(30) Foreign Application Priority Data

Mar. 20, 2002    (JP) ............................. 2002-078664

(51) Int. Cl.
  *B65H 69/00*    (2006.01)
(52) U.S. Cl. ..................... 156/157; 156/304.6; 156/311
(58) Field of Classification Search ................. 156/157, 156/304.6, 311
  See application file for complete search history.

(56) References Cited

U.S. PATENT DOCUMENTS 3,519,515 A    7/1970    Jennings
4,269,647 A    5/1981    Verkinderen et al.
5,225,025 A    7/1993    Lambing et al.
6,512,064 B2    1/2003    Higuchi et al.
6,706,946 B1    3/2004    Lankhof et al.
6,841,028 B2    1/2005    Tsukada et al.

(Continued)

FOREIGN PATENT DOCUMENTS

DE    1913293    9/1970

(Continued)

OTHER PUBLICATIONS

Patent Abstracts of Japan—English Abstract of 63247023.

(Continued)

*Primary Examiner*—Kat Wyrozebski
*Assistant Examiner*—Daniel Lee
(74) *Attorney, Agent, or Firm*—Oblon, Spivak, McClelland, Maier & Neustadt, L.L.P.

(57) ABSTRACT

A method for bonding fluororesin films, a wide fluororesin film obtained by the method, and a covering material for agricultural use, made thereof, are presented. A method of bonding films (A), wherein two sheets of films (A) made of a fluororesin, are disposed so that their edges overlap each other, a central part (b1) of the overlapping portion (B) is press-bonded under heating at a temperature within a range of from lower by 5° C. to higher by 20° C. than the melting point of the fluororesin, and then the entire area of the portion (B) is press-bonded at a temperature within a range of from lower by 30° C. to lower by more than 5° C., than the melting point, to weld the two sheets of films (A); a wide fluororesin film obtained by the method; and a covering material for agricultural use, made thereof.

14 Claims, 4 Drawing Sheets

U.S. PATENT DOCUMENTS

| | | | |
|---|---|---|---|
| 6,878,440 | B1 | 4/2005 | Yamanaka et al. |
| 6,893,729 | B2 | 5/2005 | Inaba et al. |
| 2002/0172792 | A1 | 11/2002 | Jarvis et al. |
| 2003/0113502 | A1 | 6/2003 | Tsukada et al. |

FOREIGN PATENT DOCUMENTS

| | | | | |
|---|---|---|---|---|
| DE | 19624625 | | 1/1998 | |
| EP | 1319495 | A1 | 6/2003 | |
| FR | 1382294 | | 11/1963 | |
| FR | 2655290 | | 6/1991 | |
| JP | 61-166840 | A | 7/1986 | |
| JP | 63247023 | A | * | 10/1988 |
| JP | 3-288754 | | | 12/1991 |
| JP | 5-147108 | A | | 6/1993 |
| JP | 7-32481 | A | | 2/1995 |
| JP | 07032481 | A | * | 2/1995 |
| JP | 9-183159 | A | | 7/1997 |
| JP | 11-268132 | A | | 10/1999 |
| JP | 11268132 | A | * | 10/1999 |

OTHER PUBLICATIONS esp@cenet—English Abstract of DE 19624625.
Patent Abstracts of Japan—English Abstract of JP59033375.
esp@cenet—English Abstract of FR2655290.

* cited by examiner

METHOD OF BONDING FLUORORESIN FILMS, AND FLUORORESIN FILM

This is a divisional application of U.S. application Ser. No. 10/943,944, filed Sep. 20, 2004, which is a continuation of PCT/JP03/03421 filed on Mar. 20, 2003.

TECHNICAL FIELD

The present invention relates to a method of bonding fluororesin films, a wide fluororesin film obtained by the method, and a covering material for agricultural use and a film structure, made thereof.

BACKGROUND ART

A wide film is usually used for a covering material for agricultural use. A film to be industrially produced, such as a polyvinyl chloride film for agricultural use (hereinafter referred to as an agricultural PVC film) has a width of from 1 to 4 m, and films are bonded to one another to obtain a wider film which is used for a covering material for agricultural use. As a bonding method, it is common to employ a bonding method in which edges of two sheets of films are overlapped, and the overlapping portion is welded by press bonding under heating.

However, if fluororesin films are bonded by such a conventional bonding method, the entire area of the overlapping portion is press-bonded under heating at a temperature of at least the melting point of the fluororesin by a heat press bonding machine, whereby the strength of the welded portion in contact with the edge portion of the heater of the heat press bonding machine, tends to be low, and there will be a problem that the tear strength at the welded portion and its peripheral portion tends to be low. To solve such a problem, a bonding method may sometimes be employed wherein welding is carried out by press bonding under heating at a temperature lower than the melting point of the fluororesin. However, such a method has a problem that if the temperature is low, the overlapping portion may not sufficiently be welded, and consequently, the welded portion of the film is likely to undergo peeling.

Also in a case where such a fluororesin film is used as a material for a film structure, there will be a problem that the welded portion of the film is likely to undergo peeling, as mentioned above.

It is an object of the present invention to provide a method of bonding fluororesin films, whereby the welded portion is excellent in tear strength, has high welded strength and is not susceptible to peeling.

Another object of the present invention is to provide a wide fluororesin film having a width of from 1 to 150 m, having at least two sheets of fluororesin films bonded by repeating the above bonding method at least once, and a covering material for agricultural use, made of such a wide fluororesin film.

DISCLOSURE OF THE INVENTION

The present invention provides a method of bonding fluororesin films, which is a method of bonding films (A) made of a fluororesin, characterized in that two sheets of films (A) are disposed so that their edges overlap each other, a central part (b1) of the overlapping portion (B) is press-bonded under heating at a temperature within a range of from lower by 5° C. to higher by 20° C. than the melting point of the fluororesin, and then the entire area of the portion (B) is press-bonded at a temperature within a range of from lower by 30° C. to lower by more than 5° C., than the melting point, to weld the two sheets of films (A).

Further, the present invention provides a method of bonding fluororesin films, which is a method of bonding films (A) made of a fluororesin, characterized in that two sheets of films (A) are disposed so that their edges overlap each other to form an overlapping portion (B), then a film (C) made of a fluororesin is disposed so that it overlaps on the overlapping portion (B), then a central part (b1) of the overlapping portion (B) is press-bonded from above the film (C) under heating at a temperature within a range of from lower by 5° C. to higher by 20° C. than the melting point of the fluororesin, and then the overlapping portion (B) and the film (C) are press-bonded at a temperature within a range of from lower by 30° C. to lower by more than 5° C., than the melting point, to weld the two sheets of films (A) and the film (C).

Further, the present invention provides a wide fluororesin film having a width of from 1 to 150 m, having at least two sheets of films (A) bonded by repeating the above bonding method at least once, a covering material for agricultural use, made of such a wide fluororesin film, and a material for a film structure, made of such a wide fluororesin film.

DESCRIPTION OF SYMBOLS

1: Film (A) made of a fluororesin
2: Overlapping portion (B)
3: Central part (b1)
4: High temperature welded portion
5: Low temperature welded portion
6: Film (C) made of a fluororesin
7: Overlapping portion (c1)
8: Edge (c2)
9: Hydrophilic surface-treatment layer (D)
10: Central upper heater (H1)
11: Lower heater (H2)
12: Transport belt (release film)
13: Cooling plate
14: Upper heater (H3)
15: Lower heater (H4)

MODE FOR CARRYING OUT THE INVENTION

Figure 1:
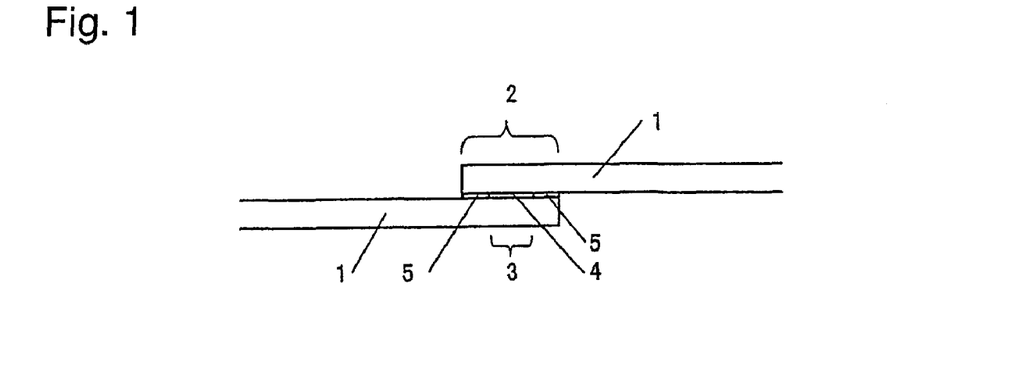
FIG. 1 is a view illustrating an example of the cross-sectional shape of fluororesin films bonded by the bonding method of the present invention.
Figure 2:
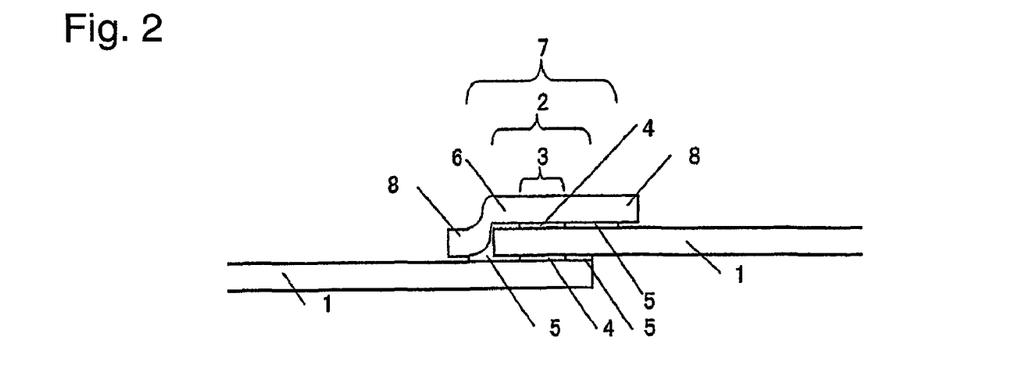
FIG. 2 is a view illustrating an example of the cross-sectional shape of fluororesin films bonded by the bonding method of the present invention.
Figure 3:
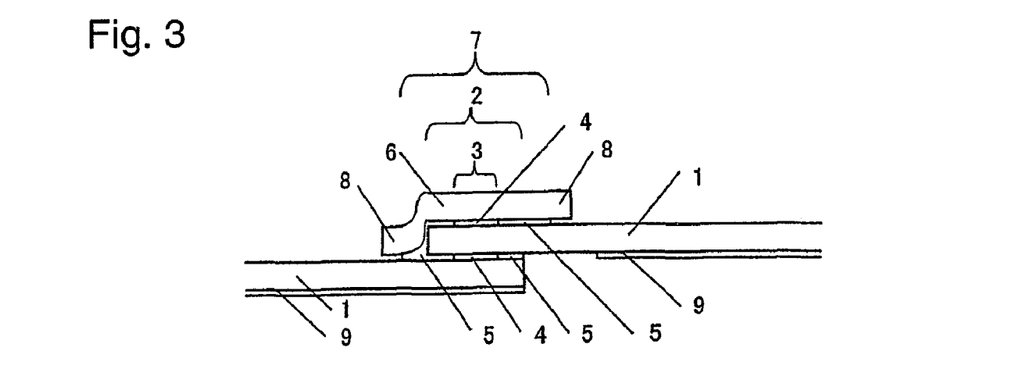
FIG. 3 is a view illustrating an example of the cross-sectional shape of fluororesin films having a hydrophilic surface-treatment layer on one side, bonded by the bonding method of the present invention.

FIGS. 1 to 3 illustrate examples of the cross-sectional shape of the bonded portion of films (A) made of a fluororesin, as bonded by the bonding method of the present invention. FIG. 1 illustrates the cross-sectional shape of the bonded portion of films (A)1, FIG. 2 illustrates the cross-sectional shape of the bonded portion wherein a film (C) made of a fluororesin was overlaid on and welded to films (A)1; and FIG. 3 illustrates the cross-sectional shape of the bonded portion wherein a film (C)6 made of a fluororesin is overlaid on and welded to films (A)1 having a hydrophilic surface-treatment layer (D)9 on one side.

In FIG. 1, the central part (b1)3 of the overlapping portion (B)2 of two sheets of films (A)1 is welded by press-bonding under heating at a temperature within a range of from lower by 5° C. to higher by 20° C. than the melting point of the fluororesin, and other portion is welded by press bonding under heating at a temperature within a range of from lower by 30° C. to lower by more than 5° C., than the melting point. Hereinafter, the portion welded at a temperature within a range of from lower by 5° C. to higher by 20° C. than the melting point will be referred to as a high temperature welded portion 4, and the portion welded at a temperature within a range of from lower by 30° C. to lower by more than 5° C. than the melting point will be referred to also as a low temperature welded portion 5.

At the bonded portion of the two sheets of films (A)1 and a film (C)6 in FIG. 2, a welded portion having two layers of a film (A)/a film (C) overlapped each other and a welded portion having three layers of a film (A)/a film (A)/a film (C) overlapped one on another, are formed. Also in this case, a high temperature welded portion 4 and a low temperature welded portion 5 are formed. Further, in this example, both edges (c2)8 of the film (C)6 are not welded.

FIG. 3 is a cross-sectional view similar to FIG. 2 except that the films to be bonded are films (A)1 having a hydrophilic surface-treatment layer (D)9 on one side. Namely, a welded portion having two layers of a film (A)/a film (C) overlapped each other and a welded portion having three layers of a film (A)/a film (A)/a film (C) overlaid one on another, are formed. Further, if heat press bonding is carried out via a hydrophilic surface-treatment layer (D), welding will be inadequate, and accordingly, no hydrophilic surface-treatment layer (D)9 is formed along the edge of one of the films (A)1 forming the overlapping portion (B)2. such a film may be produced, for example, by a method of preliminarily making such an edge when the hydrophilic surface treatment layer (D) is formed on the film (A).

Figure 4:
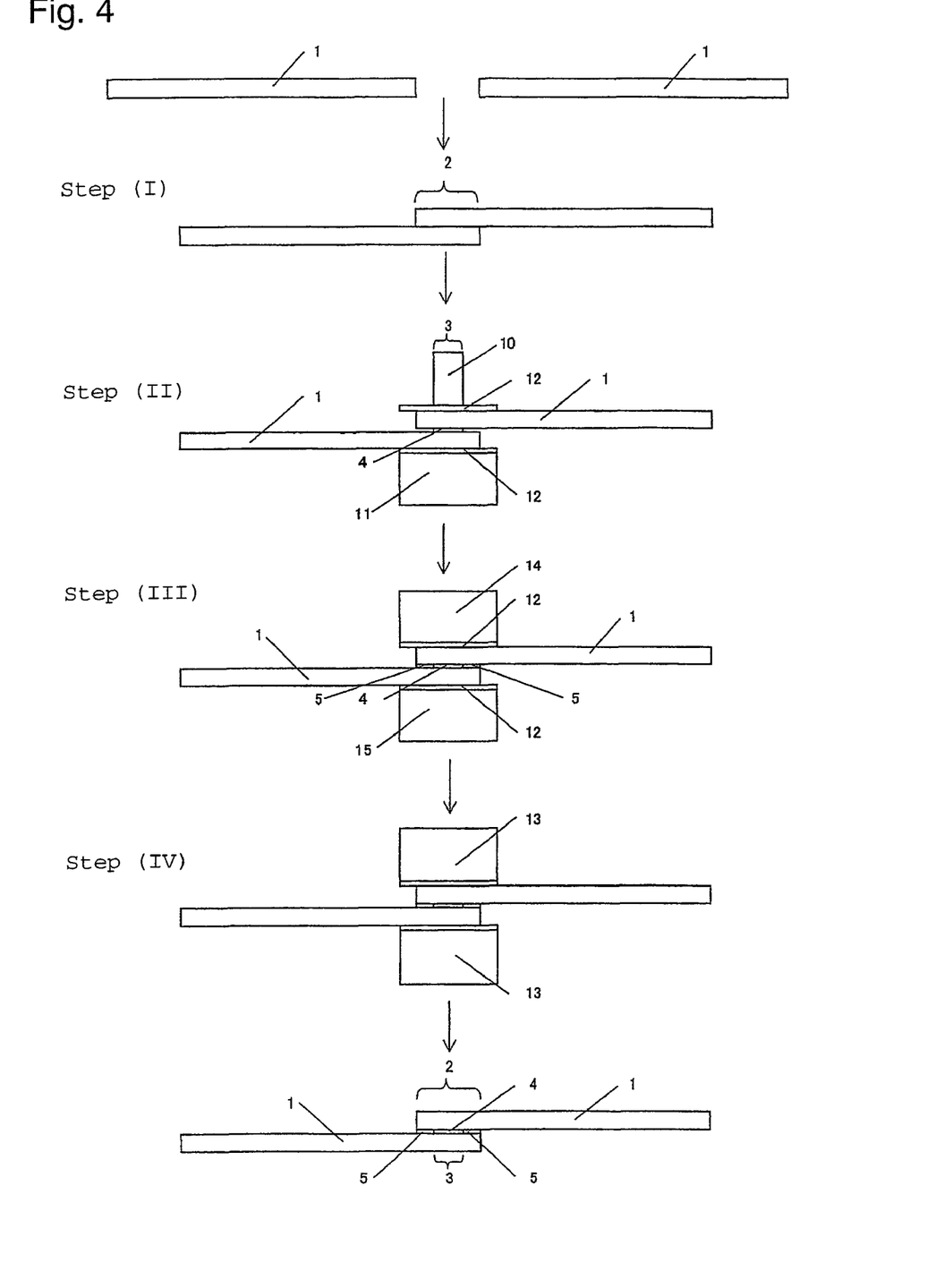
FIG. 4 is a view illustrating an example of the process for bonding fluororesin films.
Figure 5:
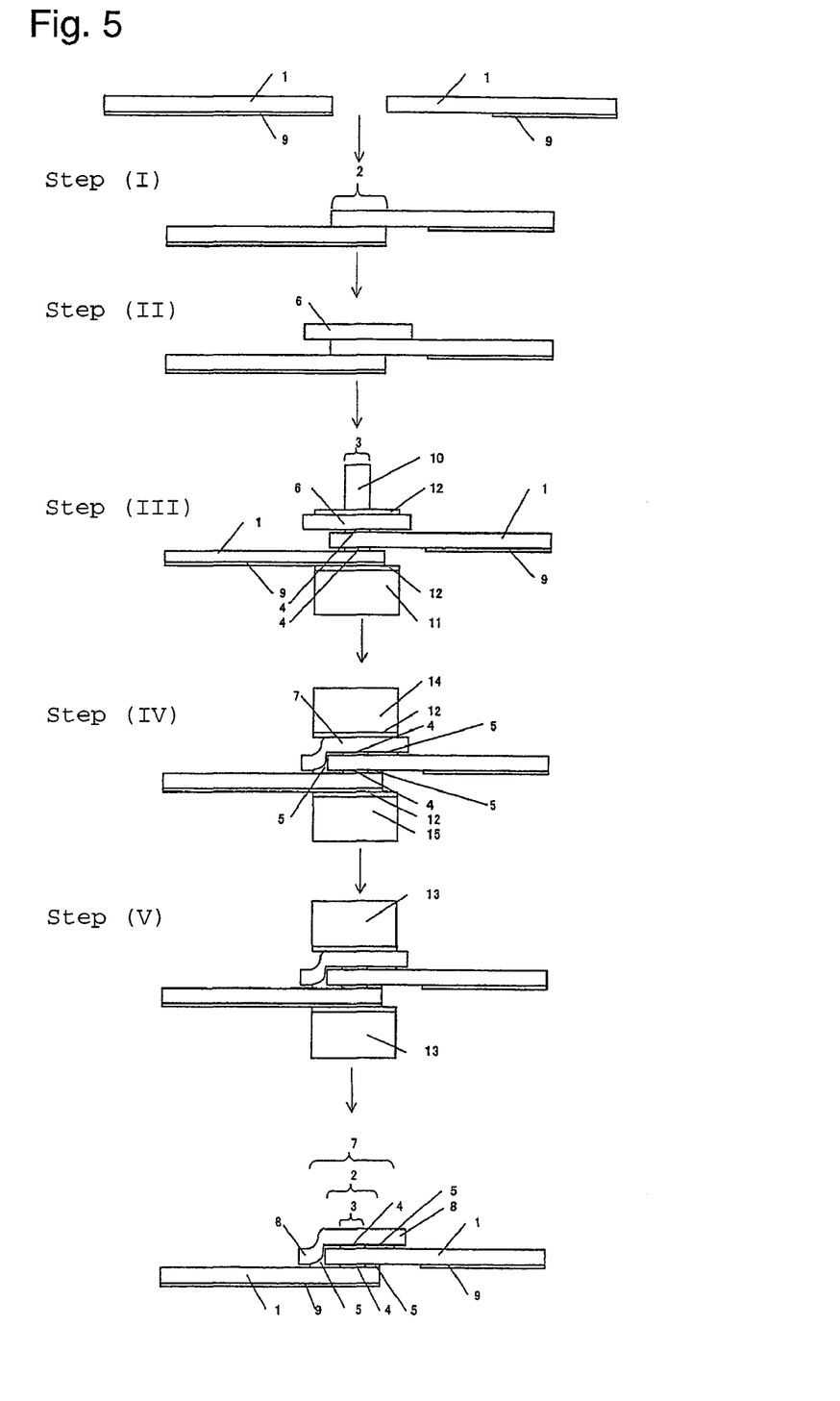
FIG. 5 is a view illustrating an example of the process for bonding fluororesin films having a hydrophilic surface-treatment layer on one side.

FIGS. 4 and 5 illustrate examples for the process of bonding films (A) of the present invention. FIG. 4 illustrates a process of bonding films having the cross-sectional shape of the bonded portion as illustrated in FIG. 1. In step (I), two sheets of films (A)1 are put together to overlap each other. Then, in a state where a transport belt 12 made of a release sheet is interposed between a heater and a film (A), step (II) will be carried out. In Step (II), by means of a central upper heater (H1)10 and a bottom heater (H2)11, the central part (b1)3 of the overlapping portion (B)2 is press-bonded at a temperature within a range of from lower by at least 5° C. to higher by less than 20° C. than the melting point of the fluororesin, to form a high temperature welded portion 4. Then, in step (III), by means of the upper heater (H3)14 and the bottom heater (H4)15, the entire area of the overlapping portion (B)2 is press-bonded under heating at a temperature within a range of from lower by 30° C. to lower by more than 5° C. than the melting point of the fluororesin to form a low temperature welded portion 5. Then, in step (IV), the welded films (A) are cooled by cooling plates 13.

FIG. 5 illustrates a process for bonding films having the cross-sectional shape of the bonded portion as illustrated in FIG. 3. In step (I), two sheets of films (A)1 having a hydrophilic surface-treatment layer (D)9 on one side are put together to overlap each other. At that time, the upper film (A)1 is overlaid along the edge having no hydrophilic surface treatment layer (D)9. Then, in step (II), a film (C)6 having a width wider than the overlapping portion (B)2 is overlaid on the overlapping portion (B)2. Then, in step (III), by means of a central upper heater (H1)10 and a bottom heater (H2)11, the central part (b1)3 of the overlapping portion (B)2 is press-bonded under heating at a temperature within a range of from lower by 5° C. to higher by less than 20° C. than the melting point of the fluororesin to form a high temperature welded portion 4. Then, in step (IV), by means of an upper heater (H3)14 and a bottom heater (H4)15, the overlapping portion (B) and the film (C) are press-bonded under heating at a temperature within a range of from lower by 30° C. to lower by more than 5° C. than the melting point of the fluororesin to weld the films (A) and the film (C) thereby to form a lower temperature welded portion 5. At the time of this heat press bonding, the overlapping portion (c1)7 of the films (A) and the film (C) undergoes deformation, whereby a welded portion of two layers of film (A)/film (C) and a welded portion of three layers of film (A)/film (A)/film (C) will be formed. Like in this case, if an upper heater (H3)14 and a bottom heater (H4)15 having a width narrower than the width of the film (C) are used, both edges (c2)8 of the film (C) will not be welded. Then, in step (V), the welded films (A) and film (C) are cooled by cooling plates 13.

Figure 6:
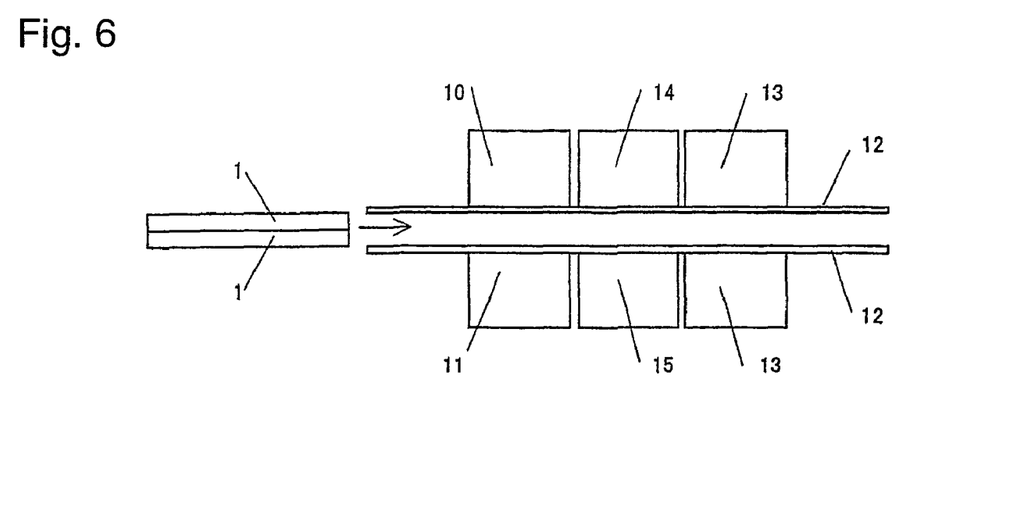
FIG. 6 is a view illustrating the cross section of a heat press bonding section of a heat press bonding machine to be used for bonding fluororesin films by press bonding under heating.
Figure 7:
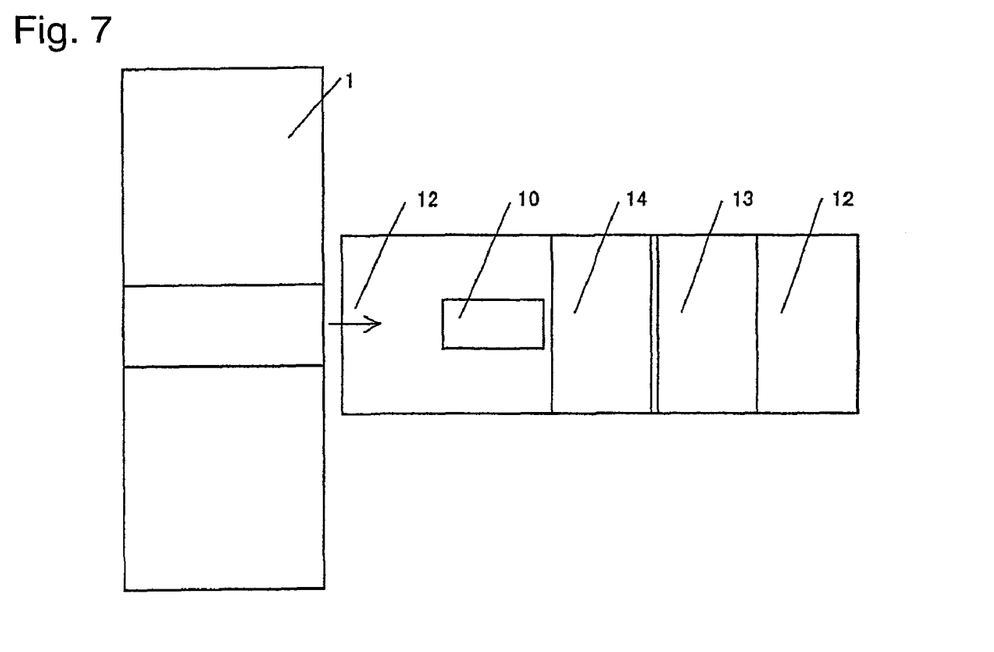
FIG. 7 is a top view of the heat press bonding section of the heat press bonding machine to be used for bonding fluororesin films by press bonding under heating.

FIG. 6 illustrates a cross-sectional view of a heat press bonding portion of a heat press bonding machine to be used for welding by heat press bonding of films (A)1 made of a fluororesin, and FIG. 7 illustrates a top surface view of the heat press bonding portion. Sequentially in the transporting direction of the film, the heat press bonding portion comprises an upper central heater (H1)10 and a lower heater (H2)11 for heat press bonding of the central part (b1) of the films (A) at a temperature within a range of from lower by 5° C. to higher by less than 20° C. than the melting point of the fluororesin, an upper heater (H3)14 and a lower heater (H4)15 for heat press bonding of the entire overlapping portion at a temperature within a range of from lower by 30° C. to lower by more than 5° C. than the melting point of the fluororesin, and cooling plates 13. At the time of the heat press bonding, the films are transported by a transporting belt 12. As the pressure for heat press bonding, the pressure due to the heater's own weight may be sufficient, but a load may additionally be exerted to increase the pressure. The pressure is preferably from 0.01 to 10 MPa, more preferably from 0.1 to 1 MPa. In the above process, the order of the upper central heater (H1)10 and the lower heater (H2)11, and the upper heater (H3)14 and the lower heater (H4)15, may be reversed. Further, the width of the lower heater (H2) or (H4) is preferably the same or wider than the width of the upper heater (H3). Further, the step of cooling the welded films (A) is not necessarily required, but it is usually preferred to insert the cooling step. It is preferred to insert the cooling step, whereby the releasability between the film (A) and the release sheet (the transport belt) will be further improved. For the cooling, other than employing cooling plates, etc., it is also preferred to use air for cooling.

In the bonding method of the present invention, two sheets of films (A) are disposed so that their edges overlap each other, a central part (b1) of the overlapping portion (B) is press-bonded under heating at a temperature within a range of from lower by 5° C. to higher by 20° C. than the melting point of the fluororesin, and then, the entire area of the portion (B) is press-bonded at a temperature within a range of from lower by 30° C. to lower by more than 5° C., than the melting point, to weld the two sheets of films (A).

Further, two sheets of films (A) are disposed so that their edges overlap each other to form an overlapping portion (B), then a film (C) made of a fluororesin is disposed so that it overlaps on the overlapping portion (B), then a central part (b1) of the overlapping portion (B) is press-bonded from above the film (C) under heating at a temperature within a range of from lower by 5° C. to higher by 20° C. than the melting point of the fluororesin, and then the overlapping portion (B) and the film (C) are press-bonded at a temperature within a range of from lower by 30° C. to lower by more than 5° C., than the melting point, to weld the two sheets of films (A) and the film (C).

When the heating temperatures are set within the above-mentioned ranges, the tear strength of the welded portion and its peripheral portion of the film will be improved. The heating temperature at the central portion (b1) is preferably within a range of from lower by 0° C. to higher by 10° C., more preferably from lower by 0° C. to higher by 5° C., than the melting point of the fluororesin. The heating temperature at the overlapping portion (B), or the overlapping portion (B) and the film (C), is preferably within a range of from lower by 20° C. to lower by more than 5° C., more preferably from lower by 15° C. to lower by more than 5° C., than the melting point of the fluororesin.

In the present invention, the width of the overlapping portion (B) of films (A) is preferably from 5 to 100 mm, more preferably from 10 to 50 mm, most preferably from 11 to 29 mm.

The width of the central portion (b1) is preferably from 1 to 50 mm, more preferably from 5 to 20 mm.

The width of the overlapping portion (c1) of the film (C) made of a fluororesin is preferably from 15 to 110 mm, more preferably from 20 to 60 mm, most preferably from 21 to 39 mm. Further, both edges (c2) of the film (C) may be welded or may not be welded to the films (A). In a case where it is not welded, the width not welded is preferably from 0.5 to 10 mm, more preferably from 0.5 to 5 mm, most preferably from 0.5 to 2.5 mm, from the end. It is preferred that the edges (c2) are not welded, whereby the tear strength at the welded portion and its peripheral portion will be improved.

In the present invention, the width of a film (A) is preferably from 50 to 210 cm, more preferably from 110 to 160 cm. This range is preferred, since it is usually the prescribed width of a covering material for agricultural use. The thickness of a film (A) is preferably from 10 to 300 μm, more preferably from 50 to 100 μm. When the thickness is within this range, the strength will be high, and the heat conduction will also be excellent. The width of the film (C) is preferably from 18 to 113 cm, more preferably from 23 to 63 cm, most preferably from 24 to 43 cm. Further, the width of the film (C) is preferably wider than the overlapping portion (B), and it is preferably wider by from 1 to 10 mm, more preferably wider by from 2 to 5 mm, than the overlapping portion (B). Further, the thickness of the film (C) is preferably from 10 to 300 μm, more preferably from 50 to 100 μm. When the thickness is within this range, the strength will be high, and the heat conduction will be excellent.

According to the bonding method of the present invention, it is possible to obtain a wide fluororesin film having at least two sheets of films (A) made of a fluororesin, bonded by repeating the above-mentioned bonding method at least once. Particularly, taking into consideration the handling efficiency, etc., a wide fluororesin film having a width of from 1 to 150 m is preferred, and a wide fluororesin film having a width of from 8 to 60 m is more preferred.

In the present invention, a covering material for agricultural use can be obtained which is made of the wide fluororesin film having a width of from 1 to 150 m. More preferred is a covering material for agricultural use made of a wide fluororesin film having a width of from 8 to 60 m.

The fluororesin for the films (A) of the present invention may, for example, be ETFE, a tetrafluoroethylene/perfluoro (alkyl vinyl ether) copolymer (hereinafter referred to as PFA), a tetrafluoroethylene/hexafluoropropylene copolymer (hereinafter referred to as FEP), a polychlorotrifluoroethylene (PCTFE), a polyvinylidene fluoride (PVDF) or a polyvinyl fluoride (PVF). Preferred is ETFE, PFA or FEP, and more preferred is ETFE.

ETFE is preferably a copolymer of tetrafluoroethylene (hereinafter referred to as TFE) with ethylene (hereinafter referred to as E), or a copolymer of TFE, E and other monomers.

Such other monomers may, for example, be a fluoroolefin such as chlorotrifluoroethylene, hexafluoropropylene, a perfluoro(alkyl vinyl ether) or vinylidene fluoride, a polyfluoroalkylethylene such as $CH_2=CHR^f$ (wherein $R^f$ is a $C_{1-8}$ polyfluoroalkyl group, the same applies hereinafter) or $CH_2=CFR^f$, and a polyfluoroalkyltrifluorovinyl ether such as $CF_2=CFOCH_2R^f$. These monomers may be used alone or in combination of two or more of them.

Particularly preferred is the above $CH_2=CHR^f$. $R^f$ is more preferably a $C_{3-6}$ perfluoroalkyl group, most preferably $C_4F_9$.

With respect to the composition of the above ETFE, the molar ratio of polymerized units based on TFE/polymerized units based on E is preferably from 70/30 to 30/70, more preferably from 65/35 to 40/60, most preferably from 60/40 to 45/55.

In a case where polymerized units based on other monomers are contained, the content of polymerized units based on such other monomers is preferably from 0.01 to 30 mol %, more preferably from 0.05 to 15 mol %, most preferably from 0.1 to 10 mol %, based on the total molar amount of polymerized units based on TFE and ethylene.

Further, the film (C) is preferably a film made of a fluororesin having a melting point which is the same or close to the fluororesin for the films (A). It is more preferably a film made of the same fluororesin as the fluororesin for the films (A). If they are made of the same fluororesin, the film (C) and the films (A) will be excellent in the welding property.

In the present invention, a wet method or a dry method may be employed as a method of forming the hydrophilic surface-treatment layer for the production of a film (A) having a hydrophilic surface-treatment layer on one side. The wet method may, for example, be a method of coating a solution of a hydrophilic substance by a roller, a method of spray coating such a solution, a method of coating such a solution by a brush, or a method of coating such a solution by a coating machine. Preferred is a method of coating a solution of a hydrophilic substance by a coating machine, or a method of spray coating such as solution.

The dry method may, for example, be a sputtering method, a vacuum vapor deposition method, a CVD method or an ion plating method, of a hydrophilic substance. Preferred is a method of sputtering a hydrophilic substance, whereby the productivity is high, and retention of the hydrophilic property will be excellent.

The hydrophilic substance may, for example, be a colloidal sol of an inorganic substance such as $SiO_2$ or $Al_2O_3$, a polyvinyl alcohol, a hydrophilic resin of e.g. acrylic acid, or an oxide of a metal such as Si, Sn, Ti, Nb, Al or Zn.

Particularly preferred is a sputtering method of an oxide of a metal such as Si, Sn or Ti. In such a case, it is particularly preferred to employ an oxide of a metal such as Si or Ti.

The covering material for agricultural use of the present invention will be stretched for an agricultural house so that the hydrophilic surface treatment layer (D) after heat press bonding will be located inside. In a case where the covering material has no hydrophilic surface treatment layer (D), after the stretching, the inside surface of the agricultural house is subjected to hydrophilic treatment by a method such as spray coating of a hydrophilic treatment agent. With an agricultural house having such a hydrophilic surface-treatment layer, the inside surface is excellent in a droplet flowing property, and even if moisture in the house is condensed on the inside surface of the house, the water droplets tend to readily flow, whereby it will be less likely that water droplets fall on crop plants to hinder the growth of the crop plants. Further, the covering material for agricultural use of the present invention is excellent in the welding strength and the tear strength of the film, whereby it is possible to prevent penetration of water or soil without peeling of the bonded portions over a long period of time.

A fluororesin film having a width of from 1 to 150 m, bonded by the bonding method of the present invention, is applicable not only to a covering material for agricultural use for e.g. an agricultural house or a horticultural house, but also to a material for a film structure such as a tent material, a film for a solar collector or a film for a roof of a large building, a material for bags, a material for waterproof sheets, or a material for water stopping sheets.

EXAMPLES

Example 1

Two sheets of an ETFE film (AFLEX FILM, manufactured by Asahi Glass Company, Limited, melting point: 260° C.) having a thickness of 60 μm and a width of 1 m, were prepared and disposed so that their edges overlapped each other, whereupon the overlapping portion was bonded by means of a heat press bonding machine (continuous heat sealer, manufactured by QUEEN LIGHT ELECTRONIC INDUSTRIES LIMITED). The bonding was carried out in accordance with the procedure shown in FIG. 4. Firstly, the central part (b1)3 of the overlapping portion was welded by press-bonding under heating at 260° C. Then, the entire area (B)2 was press-bonded under heating at 250° C. to weld the edges. The cross-sectional shape of the bonded portion was the same as shown in FIG. 1. The width of the overlapping portion (B)2 was 20 mm, and the width of the central part (b1)3 was 10 mm. The portion where the two sheets of the films were heat press-bonded, was in a sufficiently welded state. The Elmendorf tear strength of the bonded portion of the ETFE films was 5.3 N, thus showing excellent tear strength. Here, the Elmendorf tear strength was measured in accordance with JIS K6732 (1996) by using a sample having a size of 63 mm×76 mm and by imparting a cut line of 20 mm in length at a non-welded portion along the edge of the bonded portion.

Example 2

Two sheets of the same ETFE film as used in Example 1 were prepared and disposed so that their edges overlapped each other. Then, an ETFE film having a thickness of 100 μm and a width of 33 mm was overlaid thereon. The overlapping portion was bonded by means of the same heat press bonding machine as used in Example 1. The bonding was carried out in accordance with the procedure shown in FIG. 5. Firstly, the central part (b1)3 of the overlapping portion was welded by press-bonding under heating at 260° C. Then, a width of 15 mm on both sides of the center was welded by press bonding under heating at 250° C. The cross-sectional shape of the bonded portion was the same as shown in FIG. 2. The width of the overlapping portion (B)2 was 20 mm, the width of the central part (b1)3 was 10 mm, the width of the overlapping portion (c1)7 was 30 mm, and the width of the non-welded edge (c2)8 was 1.5 mm. The portion where two or three sheets of the overlapped films were heat press-bonded, was in a sufficiently welded state. Further, the Elmendorf tear strength of the bonded portion of the ETFE films was 7.7 N, as measured in the same manner as in Example 1, thus showing excellent tear strength.

COMPARATIVE EXAMPLE 1

Two sheets of the same ETFE film as used in Example 1 were prepared and disposed so that their edges overlapped each other. The entire area of the overlapping portion was bonded by welding at 280° C. by means of a heat press bonding machine. The width of the overlapping portion was 20 mm. The portion where two sheets of the films were heat press-bonded, was in a sufficiently welded state. The Elmendorf tear strength at the bonded portion of the ETFE films was 4.6 N, as measured in the same manner as in Example 1, and thus, the tear strength was lower than in Example 1.

INDUSTRIAL APPLICABILITY

According to the present invention, a method of bonding films made of a fluororesin, is provided whereby the welding strength at the welded portion is high, the tear strength is excellent, and the bonded portion will not easily be peeled. Further, by repeating the bonding method of the present invention, it is possible to obtain a wide fluororesin film. Further, the obtained wide fluororesin film is suitable for a covering material for agricultural use.

When a fluororesin film formed by bonding by the bonding method of the present invention is used for a covering material for agricultural use, such as a stretching film for an agricultural house, it is excellent in the welding strength and the tear strength at the bonded portion of the films, whereby the welded portion will not be peeled, and penetration of water or soil can be prevented, over a long period of time.

The entire disclosure of Japanese Patent Application No. 2002-78664 filed on Mar. 20, 2002 including specification, claims, drawings and summary is incorporated herein by reference in its entirety.

What is claimed is:

1. A method of bonding fluororesin films, comprising bonding films (A) made of a fluororesin, wherein two sheets of films (A) are disposed so that their edges overlap each other to form an overlapping portion (B), a central part (b1) of the overlapping portion (B) is press-bonded under heating at a temperature within a range of from lower by 5° C. to higher by 20° C. than the melting point of the fluororesin, and then the entire area of the portion (B) is press-bonded at a temperature within a range of from lower by 30° C. to lower by more than 5° C., than the melting point, to weld the two sheets of films (A).

2. The bonding method according to claim 1, wherein after being welded, the films (A) are cooled.

3. The bonding method according to claim 1, wherein the films (A) made of a fluororesin are films (A) made of a fluororesin having a hydrophilic surface-treatment layer (D) on one side, and no hydrophilic surface-treatment layer is formed on the surface to be welded at the overlapping portion (B) of one of the films (A).

4. The bonding method according to claim 1, wherein the films (A) are films made of an ethylene/tetrafluoroethylene copolymer.

5. The bonding method according to claim 1, wherein the width of the overlapping portion is from 5 to 100 mm.

6. The bonding method according to claim 1, wherein the width of the central part (b1) is from 1 to 50 mm.

7. The bonding method according to claim 1, wherein said sheets overlap only at their respective edges, and wherein said sheets are welded only by said press-bonding.

8. A method of bonding fluororesin films, comprising bonding films (A) made of a fluororesin, wherein two sheets of films (A) are disposed so that their edges overlap each other to form an overlapping portion (B), then a film (C) made of a fluororesin is disposed so that it overlaps on the overlapping portion (B), then a central part (b1) of the overlapping portion (B) is press-bonded from above the film (C) under heating at a temperature within a range of from lower by 5° C. to higher by 20° C. than the melting point of the fluororesin, and then the overlapping portion (B) and the film (C) are press-bonded at a temperature within a range of from lower by 30° C. to lower by more than 5° C., than the melting point, to weld the two sheets of films (A) and the film (C).

9. The bonding method according to claim 8, wherein after being welded, the films (A) and the film (C) are cooled.

10. The bonding method according to claim 8, wherein the films (A) made of a fluororesin are films (A) made of a fluororesin having a hydrophilic surface-treatment layer (D) on one side, and no hydrophilic surface-treatment layer is formed on the surface to be welded at the overlapping portion (B) of one of the films (A).

11. The bonding method according to claim 8, wherein the films (A) are films made of an ethylene/tetrafluoroethylene copolymer.

12. The bonding method according to claim 8, wherein the width of the overlapping portion is from 5 to 100 mm.

13. The bonding method according to claim 8, wherein the width of the central part (b1) is from 1 to 50 mm.

14. The bonding method according to claim 8, wherein said sheets overlap only at their respective edges, and wherein said sheets are welded only by said press-bonding.

\* \* \* \* \*